United States Patent [19]

Matsuno et al.

[11] E Patent Number: Re. 33,496

[45] Reissued Date of Patent: Dec. 18, 1990

[54] THERMAL TRANSFER RECORDING APPARATUS

[75] Inventors: Jyunichi Matsuno, Toride; Masataka Kawauchi, Ishioka; Masashi Yoshida, Nakaminato; Satoshi Kawamura, Yokohama, all of Japan

[73] Assignee: Hitachi, Ltd., Tokyo, Japan

[21] Appl. No.: 232,110

[22] Filed: Aug. 12, 1988

Related U.S. Patent Documents

Reissue of:

[64] Patent No.: 4,605,938
Issued: Aug. 12, 1986
Appl. No.: 726,365
Filed: Apr. 23, 1985

[30] Foreign Application Priority Data

Apr. 27, 1984 [JP] Japan ..... 59-83716

[51] Int. Cl.[5] ..... G01D 15/00

[52] U.S. Cl. ..... 346/76 PH; 364/519

[58] Field of Search ..... 346/76 PH, 134, 136; 364/518, 519; 400/186, 120, 224.2, 224.4, 224.3, 583.4

[56] References Cited

U.S. PATENT DOCUMENTS 3,813,677 5/1974 Shimotsuma ..... 346/76 R 4,427,985 1/1984 Kikuchi et al. ..... 346/76 PH

FOREIGN PATENT DOCUMENTS 2100673 1/1983 United Kingdom ..... 346/76 PH

*Primary Examiner*—Arthur G. Evans

*Attorney, Agent, or Firm*—Antonelli, Terry, Stout & Kraus

[57] ABSTRACT

A recording apparatus of thermal transfer type includes a thermal head having a plurality of linearly-arrayed heat generating elements selectively generating heat in response to the application of a character and pattern information signal providing the thermal transfer energy, and a carrier having a coating of a thermally transferably recording material. A recording medium recording character and pattern information is disposed between the carrier and a platen roller to be transported by the platen roller.

At the time of recording character and pattern information on the recording medium, the thermal transfer energy is applied to the heat generating elements corresponding to the character and pattern information signal while pressing the thermal head against the platen roller. During the recording, the thermal transfer energy is controlled to correspond to the required density tone of the character and pattern information to be recorded.

22 Claims, 5 Drawing Sheets

THERMAL TRANSFER RECORDING APPARATUS

Matter enclosed in heavy brackets [ ] appears in the original patent but forms no part of this reissue specification; matter printed in italics indicates the additions made by reissue.

BACKGROUND OF THE INVENTION

This invention relates to a recording apparatus of thermal transfer type in which a carrier such as a transfer film carrying a thermally transferable recording material is used for thermal transfer recording of information on a recording medium. More particularly, this invention relates to an aforementioned apparatus based on a density tone recording method suitable for recording of character and pattern information of high image quality at a high speed.

In a prior art recording apparatus of thermal transfer type, a carrier such as a transfer recording film having a coating of thermally transferable ink on a base is used for recording information on a recording medium such as a recording sheet, as disclosed in, for example, Japanese Patent Laid-open No. 59-42976 published on Mar. 9, 1984. The carrier and the recording medium are superposed on each other at a recording section including a thermal head and a platen roller each having substantially the same width as that of the recording medium that is, the width of the recording medium in a direction perpendicular to the direction in which the recording medium is transported through the recording section, and the thermal head is operated or energized according to a character and pattern information signal to selectively transfer the ink on the carrier onto the recording medium thereby recording the character and pattern information on the recording medium. In this transfer record mode, the character and pattern information corresponding to one line is recorded by energizing the thermal head while stopping the rotation of the platen roller and stopping the movement of the carrier and the recording medium. More particularly, the theremal head includes an array of heating resistance elements, each corresponding in size to one picture element, which are arranged in a row corresponding to one line of the picture elements disposed in the direction of the width of the recording medium, so that one line of picture elements are recorded at a time when the thermal head is depressed onto the platen roller.

Upon completion of recording of one line by the transfer of ink, the platen roller is driven to transport the carrier and the recording medium, superposed on each other, in the forward or normal direction by a distance corresponding to the line spacing. After the carrier and the recording medium have been advanced in the normal direction by the distance described above, the rotation of the platen roller is stopped, and the thermal head is energized to record character and pattern information of the next line by the transfer of ink. Such an operation is repeated to successively record character and pattern information on the recording medium. During this manner of recording, the transfer energy provided by the character and pattern information signal applied to the thermal head is controlled to control the density of transferred dots, that is, to control the so-called density tone of characters and patterns.

In such a prior art recording apparatus of thermal transfer type, it is difficult to determine the recording position with high accuracy since the recording position tends to change with a variation of the load of the platen roller. Further, when the platen roller is intermittently driven as in the case of the prior art apparatus, the picture element or dot has a shape analogous to a circular shape which is invariable. Therefore, attainment of a high density tone depends only on the transfer characteristic of the recording material coated on the carrier. Further, even when the thermal transfer energy applied to the thermal head is increased higher than a predetermined maximum level or decreased lower than a predetermined minimum level, the density will saturate and remain unchanged, and the desired improvement in the image quantity will be limited. Also, due to the intermittent drive of the platen roller and in view of the relation between the recording speed and the positioning of the recording section, a drive source operable at a high speed and capable of generating a high output is required, resulting in an increase in the power consumption and an increase in the noise.

SUMMARY OF THE INVENTION

It is a primary object of the present invention to provide a recording apparatus of thermal transfer type in which the recording section can be positioned with high accuracy and the density tone can be controlled to provide a high definition thereby improving the image quality.

The recording apparatus of thermal transfer type according to the present invention comprises a platen roller coupled to a drive source of continuously driving the platen roller, means for detecting the angular position and the rotation speed of the platen roller, and a mechanism for controlling the density tone, so that, on the basis of the detected angular position and rotation speed of the platen roller, the transfer energy corresponding to a required density can be computed. The thus computed transfer energy is applied to a thermal head for recording character and pattern information of controlled density tone on a recording medium.

DESCRIPTION OF THE PREFERRED EMBODIMENTS

Preferred embodiments of the recording apparatus of thermal transfer type according to the present invention will be described in detail with reference to FIGS. 1 to 5.

Figure 1:
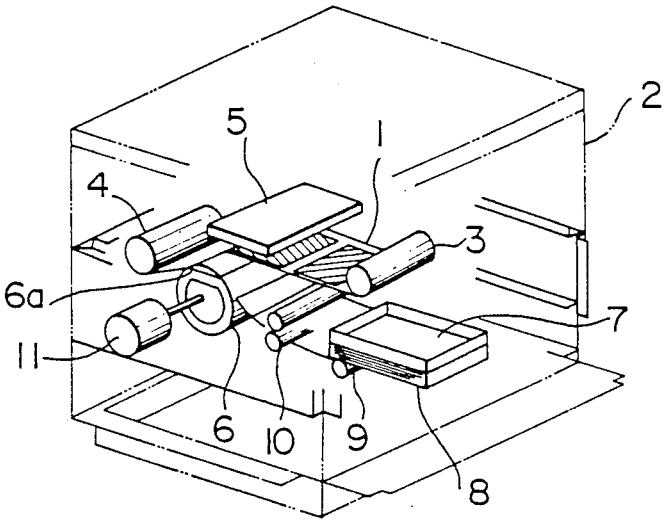
FIG. 1 is a schematic perspective of an embodiment of the recording apparatus of thermal transfer type according to the present invention.

FIG. 1 shows schematically the structure of an embodiment of the recording apparatus of the present invention. Referring to FIG. 1, a carrier which is, for example, a transfer recording film 1 is wound at one end portion thereof around a supply reel 3 supported in a casing 2 and at the other end portion thereof around a take-up reel 4 supported in the casing 2. The transfer recording film 1 is mounted so as to be transported in the normal or reverse direction under tension imparted by tension imparting means (not shown) connected between the supply reel 3 and the take-up reel 4. This transfer recording film 1 includes a base such as, for example, a wide polyester film or a condenser paper having a high resistance to heat and having a thickness as small as about 3 μm to 15 μm. A recording material such as ink rendered transferable by application of heat, or another recording material such as a heat-fusible material fused by application of heat or a sublimable paint sublimating by application of heat is coated on the upper surface of the base. This transfer recording film 1 is disposed in a recording section between a thermal head 5 supported in the casing 2 and a platen roller 6 supported also in the casing 2.

In the embodiment, recording sheets 7, which are recording media, are cut into a size substantially equal to the size of a recording frame required for recording of character and pattern information and are stacked in tiers in a cassette 8 supported in the casing 2. The stacked recording sheets 7 are separated by separating means 9 and transported one after another by transporting means 10 toward the platen roller 6.

The platen roller 6 is constructed so that the transported recording sheet 7 is wound around and held on its outer periphery in such a state that the leading end of the recording sheet 7 is engaged by a chuck portion 6a. The platen roller 6 is coupled to a drive source, for example, a DC motor 11 which continuously drives the platen roller 6.

The thermal head 5 includes a plurality of heat generating elements arranged linearly in the widthwise direction of the recording sheet 7, that is, in the direction perpendicular to the transporting direction of the recording sheet 7, so as to permit recording without making mechanical scanning in the widthwise direction of the recording sheet 7. When a character and pattern information signal providing thermal transfer energy corresponding to character and pattern information to be recorded is applied in the record mode, the corresponding heat generating elements generate heat, so that the portions of the recording material such as the ink corresponding to the energized heat generating elements can be transferred onto the recording sheet 7.

In the record mode, the thermal head 5 is pressed onto the platen roller 6 by pressing means (not shown) so that the transfer recording film 1 can be pressed against the recording sheet 7 wound around the outer periphery of the platen roller 6. The position of the leading edge of the recording-frame on the recording sheet 7 is sensed, when it reaches a predetermined position relative to the platen roller 6, by position sensing means such as a sensor disposed in the vicinity of the platen roller 6 and then the recording is started, the position of the sensor is previously adjusted so that, when the recording-frame leading edge is detected by the sensor, the platen roller 6 is located at a predetermined position relative to the thermal head 5 when the recording-frame leading edge of the recording sheet 7 is aligned with the leading edge of a contact area, called as home position, between the thermal head 5 and platen roller 6.

In such a state, a character and pattern signal corresponding to character and pattern information to be recorded is applied to apply thermal transfer energy to the thermal head 5. In synchronism with the application of the thermal transfer energy to the thermal head 5, the transfer recording film 1 is transported in the normal direction, and the platen roller 6 is rotated in the normal direction. As a result, the ink or like recording material coated on the transfer recording film 1 is rendered transferable and is transferred onto the recording sheet 7.

When, with the rotation of the platen roller 6, the trailing edge of the recording-frame on the recording sheet 7 comes to the home position i.e. the contact area between the thermal head 5 and platen roller 6, recording by transfer of the recording material onto the single recording sheet 7 is completed. The apparatus is previously so adjusted that one complete revolution of the platen roller 6 completes this transfer recording.

When color recording of character and pattern information is desired, the transfer film is previously coated with recording materials of various colors such as yellow, magenta and cyan alternatively and successively at equal intervals such that each color coat extends within a predetermined longitudinal area on the film slightly larger than the area of the recording frame on the recording medium. The tranfer film is so set that each time the platen roller 6 completes one rotation, the recording-frame leading edge of the recording sheet and the leading edge of one of the yellow, magenta and cyan color areas of the transfer recording film are aligned with the leading edge of the home position i.e. the contact area between the thermal head and platen roller. Each time the platen roller makes its one complete revolution, the thermal transfer energy provided by a character and pattern information signal corresponding to each color is applied to the thermal head. Thus, with the successive rotations of the platen roller, the recording materials of yellow, magenta and cyan colors are successively transferred to complete recording of the color character and pattern information by thermal transfer.

The process of transfer recording in the embodiment shown in FIG. 1 will now be described.

First, one of the recording sheets 7 stacked in the cassette 8 is separated by the separating means 9 and transported toward the platen roller 6 by the transporting means 10.

At this time, the tranfer recording film 1 is not in pressure engagement with the platen roller 6, and the recording sheet 7 is wound around and held on the outer periphery of the continuously rotating platen roller 6 after its leading end has been engaged by the chuck portion 6a of the platen roller 6, the transfer recording film 1 is fed between the recording sheet 7 and the thermal head 5. While pressing the thermal head 5 by the pressing means (not shown), the thermal transfer energy provided by a character and pattern information signal corresponding to character and pattern information 5. When the transferable recording material on the tranfer recording film 1 is, for example, a sublimable dye, the dye on the film 1 sublimates due to the application of the thermal transfer energy and is transferred to attached onto the recording sheet 7 as the recording sheet 7 is continuously transported, thereby recording the character and pattern information on the recording sheet 7.

The manner of density tone control in the transfer record mode will then be described.

The shape of the picture element or dot is generally circular when the platen roller 6 is intermittently driven. In contrast, the dot is extended in the feeding direction of the recording sheet 7, and its shape becomes elliptical resulting in an increased area, when the platen roller 6 is continuously driven at a predetermined speed by the DC motor 11. With the increase in the area of the dot, the Macbeth density (the average density of dots included in a circular area having a diameter of 4.6 mm) changes, and the density of dots becomes dependent upon the feed speed of the recording sheet.

Figure 2:
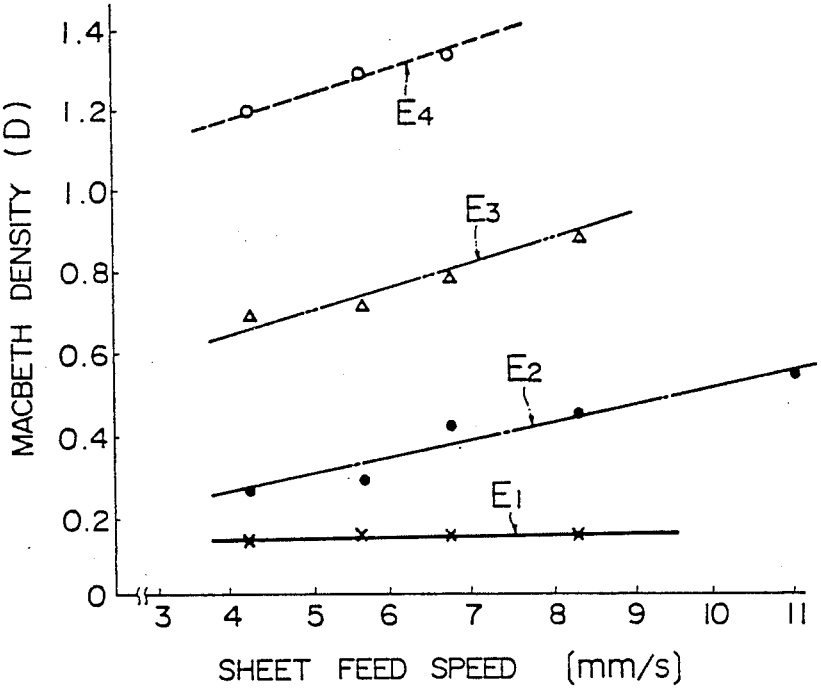
FIG. 2 is a graph showing the relation between the recording sheet feed speed and the Macbeth density in the embodiment shown in FIG. 1.

FIG. 2 is a graph showing the dot density variations relative to the feed speed. In FIG. 2, the horizontal axis represents the feed speed of the recording sheet, and the vertical axis represents the Macbeth density D. In FIG. 2, the line $E_1$ connecting the symbols X represents the Macbeth density D relative to the feed speed when the thermal transfer energy E is 9.5 mJ. Similarly, the line $E_2$ connecting the symbols of solid black dot •, the line $E_3$ connecting the symbols of triangle Δ, and the line $E_4$ connecting the symbols of circle represent the cases where the thermal transfer energy E is 19.0 mJ, 28.6 mJ and 38.1 mJ respectively. It will be seen in FIG. 2 that, although the increase in the feed speed of the recording sheet results in a corresponding increase in the Macbeth density D when the thermal transfer energy E is high, the Macbeth density D does not appreciably change relative to the increase in the feed speed of the recording sheet when the thermal transfer energy E is low. This is because, in spite of the increase in the area of dots, the tendency of the Macbeth density D becoming high is cancelled by the tendency of the Macbeth density D becoming low due to the decrease in the density per unit area attributable to the increase in the area of the dots, when it is assumed that the density per unit area is constant.

Figure 3:
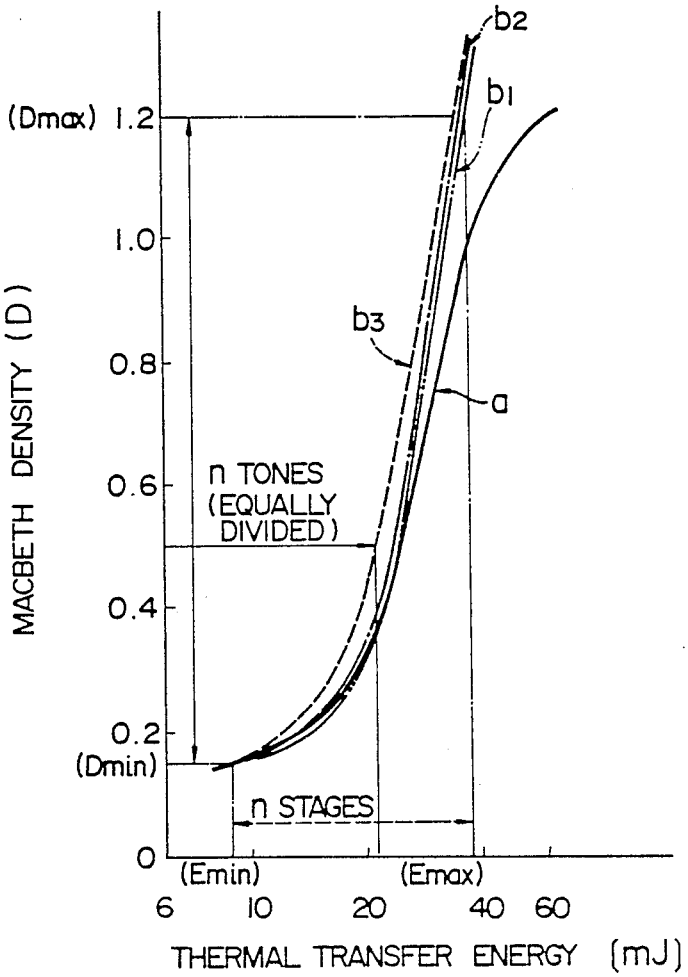
FIG. 3 is a graph showing the $\gamma$ characteristic relation to the recording sheet feed speed in the embodiment shown in FIG. 1.

FIG. 3 is a graph showing the relation between the thermal transfer energy E provided by a character and pattern information signal applied to the thermal head 5 and the Macbeth density D, that is, the $\gamma$ characteristic. In FIG. 3, the solid curve a represents the $\gamma$ characteristic when the platen roller 6 is intermittently driven. Broken curves $b_1$, $b_2$ and $b_3$ in FIG. 3 represent the $\gamma$ characteristics when the recording sheet 7 is continuously fed at respective predetermined speeds of, for example, 4.2 mm/s, 5.2 mm/s and 6.7 mm/s which are computed on the basis of the $\gamma$ characteristic shown in FIG. 3 by the solid curve a and indicative of the result of the intermittent feed and also on the basis of the relation between the recording sheet speed and the Macbeth density D shown in FIG. 2. It will be seen from the curve a that, when the platen roller 6 is intermittently driven, the Macbeth density D starts to saturate from about 0.2 and about 1.0 when the thermal transfer energy E becomes smaller than a predetermined minimum Emin and larger than a predetermined maximum Emax respectively, and the rate in variation of the Macbeth density D is greatly reduced even when the thermal transfer energy E changes.

In contrast, when the platen roller 6 is continuously driven by the DC motor 11 at a constant speed of, for example, 4.2 mm/s, 5.2 mm/s or 6.7 mm/s, and the recording sheet 7 is also continuously fed, an increase in the area of dots does not substantially result in a decrease of the density per unit area, and the Macbeth density D increases by the amount corresponding to the increased dot area. It will be seen from these curves $b_1$, $b_2$ and $b_3$ that the mode of saturation of the Macbeth density D on the sides of the minimum and maximum values of the thermal transfer energy E differs greatly from the case of the intermittent drive of the platen roller 6. The Macbeth density D saturates especially at a high level on the Emax side of the thermal transfer energy E, so that the density range can be widened to provide a higher definition.

As shown in FIG. 3, the density tone control in the present invention is such that the density tone between the maximum density Dmax and the minimum density Dmin is equally divided by the factor of n, and the range between the thermal transfer energy Emax providing the maximum density Dmax and the thermal transfer energy Emin providing the minimum density Dmin is divided into n stages corresponding to the above value of n. At each rotation speed of the platen roller 6, the thermal transfer energy E corresponding to the desired Macbeth density D is supplied on the basis of the $\gamma$ characteristic relative to the driving speed driving the platen roller 6. Thus, in the case of the continuous feed of the recording sheet 7 by continuously driving the platen roller 6, the density tone is controlled according to the $\gamma$ characteristic corresponding to the speed of continuous feeding.

Figure 4:
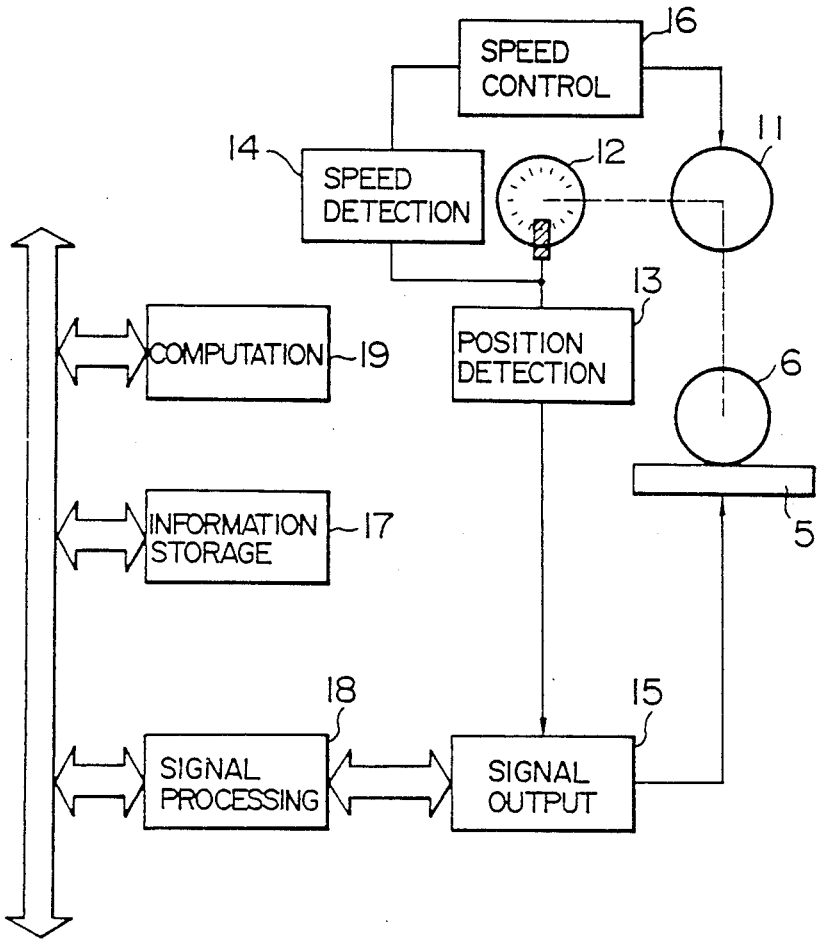
FIGS. 4 and 5 show two forms respectively of a density tone control mechanism preferably employed in the recording apparatus of the present invention.
Figure 5:
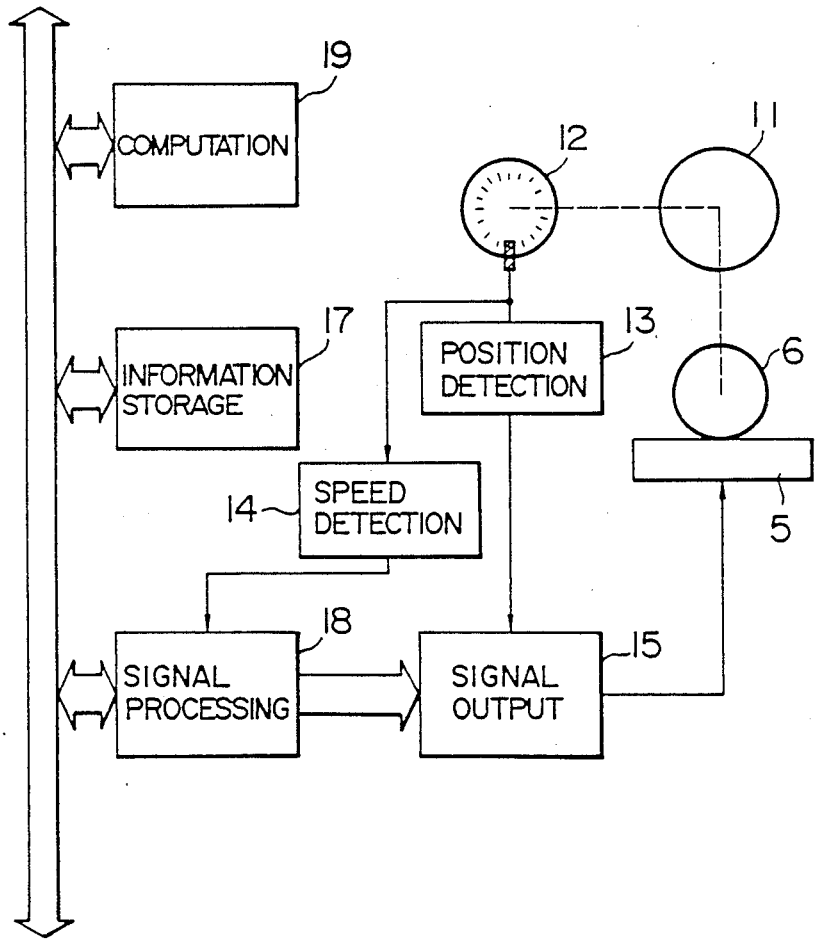

FIGS. 4 and 5 show two forms of a density tone control mechanism preferably employed in the present invention in which character and pattern information is recorded while continuously feeding the recording sheet 7 by continuously driving the platen roller 6.

In the form shown in FIG. 4, a pulse encoder 12 is coupled to the DC motor 11 which drives the platen roller 6. The pulse encoder 12 is provided to detect the angular position in rotation and the rotation speed, of the platen roller 6, and generates a train of pulses proportional to, for example, the rotation speed of the DC motor 11. Position detecting means 13 and speed detecting means 14 are coupled to this pulse encoder 12.

On the basis of the pulse train applied from the pulse encoder 12, the position detecting means 13 detects the angular position of rotation of the platen roller 6 and applies its output signal indicative of the recording position of signal output means 15. On the other hand, the speed detecting means 14 detects the rotation speed of the DC motor 11 (the rotation speed of the platen roller 6) on the basis of the pulse train applied from the pulse encoder 12 and controls the DC motor 11 to drive it at a predetermined constant rotation speed via speed control means 16. Character and pattern information storage means 17 stores character and pattern information, such as color and density signals, applied from character and pattern information input means (not shown), which may be an electronic camera or a computer graphic system, and signal processing means 18 processes the character and pattern information stored in the character and pattern information storage means 17 to provide character and pattern signals adapted to be applied to the thermal transfer recording apparatus. The operations of the signal output means 15, character and pattern information storage means 17 and signal processing means 18 are controlled by computing means 19. On the basis of the $\gamma$ characteristic corresponding to the predetermined rotation speed of the DC motor 11, hence, the recording sheet feed speed of the platen roller 6 the computing means 19 computes the thermal transfer energy for the required density, and the results of computation are previously stored in the character and pattern information storage means 17 as the character and pattern information.

Thus, the thermal transfer energy corresponding to the desired density tone of character and pattern information is applied to the thermal head 5 through the signal processing means 18 and signal output means 15, so that character and pattern information controlled in the density tone is recorded on the recording medium.

Another form shown in FIG. 5 is generally similar to the form shown in FIG. 4, except that the detected speed signal from the speed detecting means 14 is applied to the signal processing means 18, and the speed control means 16 is eliminated. The signal processing means 18 includes a memory in which the data of density changes corresponding to speed changes of the DC motor 11, hence, feed speed changes of the platen roller 6 and the data of the thermal transfer energy corresponding to the density changes are previously computed on the basis of the $\gamma$ characteristic and are stored. On the basis of the speed signal from the speed detecting means 14, the signal processing means 18 computes the speed change, and, on the basis of the computed speed change, the thermal transfer energy applied to thermal head 5 is controlled. Thus, the character and pattern information controlled in the density tone is recorded on the recording medium.

Thus, even when a variation occurs in the feed speed of the platen roller 6 in the control mechanism shown in FIG. 5, the signal processing means 18 processes the signal so that the density may not become non-uniform due to the speed variation thereby controlling the thermal transfer energy applied to the thermal head 5. Therefore, any density non-uniformity attributable to a variation of the feed speed of the platen roller 6 does not occur.

In the embodiments described above, the angular position of rotation and the rotation speed of the platen roller 6 is detected by the pulse encoder 12 coupled to the DC motor 11 driving the platen roller 6. However, in lieu thereof, a frequency generator may be coupled to the DC motor 11 so as to detect the angular position and the rotation speed of the DC motor 11 on the basis of the output signal of the frequency generator.

Further, although the DC motor 11 is used as a drive source for the platen roller 6, any other drive source capable of continuously driving the platen roller 6 may be employed.

It will be understood from the foregoing detailed description of the present invention that the recording position can be determined with high accuracy, and the density tone can be controlled to attain a high definition by application of the thermal transfer energy corresponding to a density change attributable to a change in the shape of dots, so as to improve the quality of records.

We claim:

1. A recording apparatus of thermal transfer type comprising:

a carrier supporting a coating of a thermally transferable recording material and movable along a predetermined path;

a platen roller rotatably mounted for supporting and transporting a recording medium and disposed so that said supported recording medium faces said carrier moving through said predetermined path;

a thermal head having a plurality of linearly arrayed heat generating elements for being urged against said platen roller in a recording mode and selectively energizable, thereby producing a thermal energy adapted to transfer the recording material corresponding to the energized heat generating elements onto the recording medium supported by said platen roller:

driving means for continuously driving said platen roller;

rotation detecting means for detecting a rotation speed of said platen roller, position detecting means for detecting an angular position in rotation of said platen roller;

means for producing a character and pattern signal in accordance with the rotational speed of said platen roller and a desired density tone of the record produced on said recording medium so that the thermal energy produced by the energized heat generating elements is at a level suitable to obtain the desired density tone of the record, and means for controlling the density tone in response to an output signal of said position detecting means while said platen roller is continuously driven so as to selectively energize said heat generating elements according to said character and pattern signal, thereby producing on said recording medium a record of dots with the desired density tone corresponding to said character and pattern signal.

2. A recording apparatus as claimed in claim 1, wherein said carrier is wound at one end portion thereof around supply means and is passed between said thermal head and said platen roller to be wound at the other end portion thereof around take-up means, said carrier having a tension applied thereto between said supply means and said take-up means.

3. A recording apparatus as claimed in claim 1, wherein recording materials of different colors are arranged in successive regions on said carrier.

4. A recording apparatus as claimed in claim 1, wherein said recording material is heat-fusible for being fused by application of heat.

5. A recording apparatus as claimed in claim 2, wherein said recording material is heat-fusible for being fused by application of heat.

6. A recording apparatus as claimed in claim 3, wherein said recording material is heat-fusible for being fused by application of heat.

7. A recording apparatus as claimed in claim 1, wherein said recording material is sublimable for sublimating by application of heat.

8. A recording apparatus as claimed in claim 2, wherein said recording material is sublimable for sublimating by application of heat.

9. A recording apparatus as claimed in claim 3, wherein said recording material is sublimable for sublimating by application of heat.

10. A recording apparatus as claimed in claim 1, wherein said driving means includes a DC motor.

11. A recording apparatus as claimed in claim 1, wherein said platen roller has a chuck portion at a part of its outer periphery to disengageably engage the leading end of the recording medium and the recording medium engaged at its leading end by said chuck portion is wound around and held on the outer periphery of said platen roller.

12. A recording apparatus as claimed in claim 10, wherein said platen roller has a chuck portion at a part of its outer periphery to disengageably engage the leading end of the recording medium and the recording medium engaged at its leading end by said chuck portion is wound around and held on the outer periphery of said platen roller.

13. A recording apparatus as claimed in claim 1 wherein said rotation detecting means includes a pulse encoder coupled to said driving means for said platen roller.

14. A recording apparatus as claimed in claim 1, wherein said rotation detecting means includes a frequency generator coupled to said driving means for said platen roller.

15. A recording apparatus as claimed in claim 1, wherein said character and pattern signal producing means comprises computing means for computing the level of the thermal energy to be produced by the heat generating elements corresponding to the desired density tone of the record on the recording medium as a function of the rotation speed of the platen roller, storage means for storing the results of computation by said computing means as character and pattern information, signal processing means for processing the stored character and pattern information according to the desired density tone of the record and the detected speed of the platen roller thereby producing the character and pattern signal.

16. A recording apparatus as claimed in claim 1, wherein the dots produced on said recording medium are elliptical in shape and have the desired density tone in accordance with the rotational speed of said platen roller.

*17. A recording apparatus according to claim 1, wherein said rotation detecting means is coupled to a rotation speed control means for controlling said driving means based on said detected rotation speed to maintain the rotation speed of said platen roller at a predetermined rotation speed, and further wherein said producing means produces said character and pattern signals in accordance with said predetermined rotation speed.*

*18. A recording apparatus according to claim 17, wherein said producing means includes computing means for computing the level of the thermal energy to be produced by the heat generating elements corresponding to the desired density tone of the record on the recording means on the basis of characteristics corresponding to the predetermined rotation speed of said platen roller.*

*19. A recording apparatus according to claim 17, wherein said producing means is not coupled to receive an output from said rotation detecting means.*

*20. A recording apparatus of thermal transfer type comprising:*

*a carrier supporting a coating of a thermally transferable recording material and movable along a predetermined path;*

*a platen roller rotatably mounted for supporting a recording medium and disposed so that said supported recording medium faces said carrier moving through said predetermined path;*

*a thermal head having a plurality of linearly arrayed heat generating elements for being urged against said platen roller in a recording mode and selectively energizable, thereby producing a thermal energy adapted to transfer the recording material corresponding to the energized heat generating elements onto the recording medium supported by said platen roller;*

*driving means for substantially continuously driving the recording medium;*

*position detecting means for detecting an angular position in rotation of said platen roller;*

*means for producing a character and pattern signal in accordance with a predetermined speed of said recording medium and a desired density tone of the record produced on said recording medium so that the thermal energy produced by the energized heat generating elements is at a level suitable to obtain the desired density tone of the record; and*

*means for controlling the density tone in response to an output signal of said position detecting means while said recording medium is substantially continuously driven so as to selectively energize said heat generating elements according to said character and pattern signal, thereby producing on said recording medium a record of dots with the desired density tone corresponding to said character and pattern signal.*

*21. A recording apparatus of thermal transfer type comprising:*

*a carrier supporting a coating of a thermally transferable recording material and movable along a predetermined path;*

*a platen roller rotatably mounted for supporting a recording medium and disposed so that said supported recording medium faces said carrier moving through said predetermined path;*

*a thermal head having a plurality of linearly arrayed heat generating elements for being urged against said platen roller in a recording mode and selectively energizable, thereby producing a thermal energy adapted to transfer the recording material corresponding to the energized heat generating elements onto the recording medium supported by said platen roller;*

*driving means for substantially continuously driving the recording medium at a substantially constant speed;*

*position detecting means for detecting an angular position in rotation of said platen roller;*

*means for producing a character and pattern signal in accordance with the substantially constant speed of said recording medium and a desired density tone of the record produced on said recording medium so that the thermal energy produced by the energized heat generating elements is at a level suitable to obtain the desired density tone of the record; and*

*means for controlling the density tone in response to an output signal of said position detecting means while said recording medium is substantially continuously driven at said substantially constant speed so as to selectively energize said heat generating elements according to said character and pattern signal, thereby producing on said recording medium a record of dots with the desired density tone corresponding to said character and pattern signal.*

*22. A recording apparatus of thermal transfer type comprising:*

*a carrier supporting a coating of a thermally transferable recording material and movable along a predetermined path;*

*a platen roller rotatably mounted for supporting a recording medium and disposed so that said supported recording medium faces said carrier moving through said predetermined path;*

*a thermal head having a plurality of linearly arrayed heat generating elements for being urged against said platen roller in a recording mode and selectively energizable, thereby producing a thermal energy adapted to transfer the recording material corresponding to the energized heat generating elements onto the recording medium supported by said platen roller;*

*driving means for substantially continuously driving the recording medium;*

*detecting means for detecting a speed of said recording medium;*

*position detecting means for detecting an angular position in rotation of said platen roller;*

*means for producing a character and pattern signal in accordance with the detected speed of said recording medium and a desired density tone of the record produced on said recording medium so that the thermal energy produced by the energized heat generating elements is at a level suitable to obtain the desired density tone of the record; and*

*means for controlling the density tone in response to an output signal of said position detecting means while said recording medium is driven so as to selectively energize said heat generating elements according to said character and pattern signal, thereby producing on said recording medium a record of dots with the desired density tone corresponding to said character and pattern signal.*

* * * * *